United States Patent [19]

Derringer

[11] 4,412,458

[45] Nov. 1, 1983

[54] VEHICLE PARKING BRAKE ACTUATING MECHANISM

[75] Inventor: John G. Derringer, Flint, Mich.

[73] Assignee: General Motors Corporation, Detroit, Mich.

[21] Appl. No.: 234,026

[22] Filed: Feb. 12, 1981

[51] Int. Cl.³ .......................... F16C 1/10; G05G 1/10
[52] U.S. Cl. ................................... 74/512; 74/501 R; 74/519
[58] Field of Search ...................... 74/512, 501 R, 519

[56] References Cited

U.S. PATENT DOCUMENTS 2,778,455  1/1957  Roach ............................... 74/501 R
3,241,393  3/1966  Norcross ........................... 74/501 R Primary Examiner—Kenneth Dorner
Attorney, Agent, or Firm—D. D. McGraw

[57] ABSTRACT

The parking brake mechanism includes a simplified equalizer having one end pivotally attached to a bracket on a part of the vehicle underbody. The other end of the equalizer lever receives the end of the cable from the parking brake foot pedal or hand lever. The cable end has a threaded member thereon which extends through an aperture in the end of the equalizer lever. An adjuster lock nut is attached to the threaded member to provide adjustment for the entire parking brake mechanism at this point. The equalizer lever is slightly V-shaped so that the center portion extends toward the rear of the vehicle. A parking brake cable extending from the left rear brake passes around the lever at the center portion, is retained on the lever by a lanced tab portion made from part of the lever, and then extends to the right rear parking brake. This provides a simplified yoke arrangement which eliminates parts and has a simpler adjusting mechanism than devices earlier used.

2 Claims, 3 Drawing Figures

VEHICLE PARKING BRAKE ACTUATING MECHANISM

The invention relates to the linkage between the vehicle operated parking brake lever and the wheel brakes containing the parking brake mechanism, and more particularly to an equalizer lever or bar construction. The equalizer bar has one end pivotally attached to a fixed portion of the vehicle and another end provided with an adjustable effective length link attached thereto and secured to the apply cable leading from the operator operated lever. The equalizer bar is pivoted about the one end when the apply cable is moved by tension force exerted by the operator. The equalizer bar has a center section receiving a loop of a brake actuating cable thereabout. The brake actuating cable has segments extending from the loop to the wheel brakes and is tensioned and moved when the apply cable is tensioned and moved. The equalizer bar center section engaging the brake actuating cable loop is angularly displaced toward the wheel brakes relative to the equalizer bar ends. Lines from the equalizer bar ends to the cable-engaging center portion intersect at the center portion at an angle other than 180° in the plane of pivotal movement of the equalizer bar. Means for retaining the brake actuating cable loop in position on the equalizer bar center section are provided, and in the embodiment illustrated includes a tab struck from the bar center section and bent over the brake actuating cable loop to retain the cable in position.

IN THE DRAWING

Figure 1:
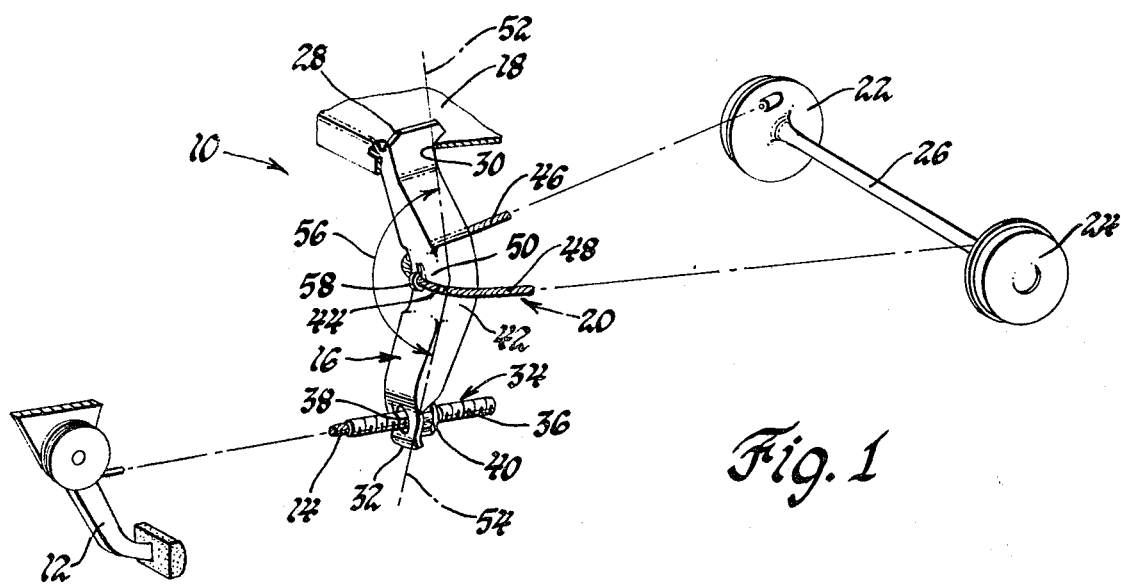
FIG. 1 is a perspective view of a vehicle parking brake actuating mechanism embodying the invention, with parts broken away and in section and portions of the parking brake system being illustrated schematically.
Figure 2:
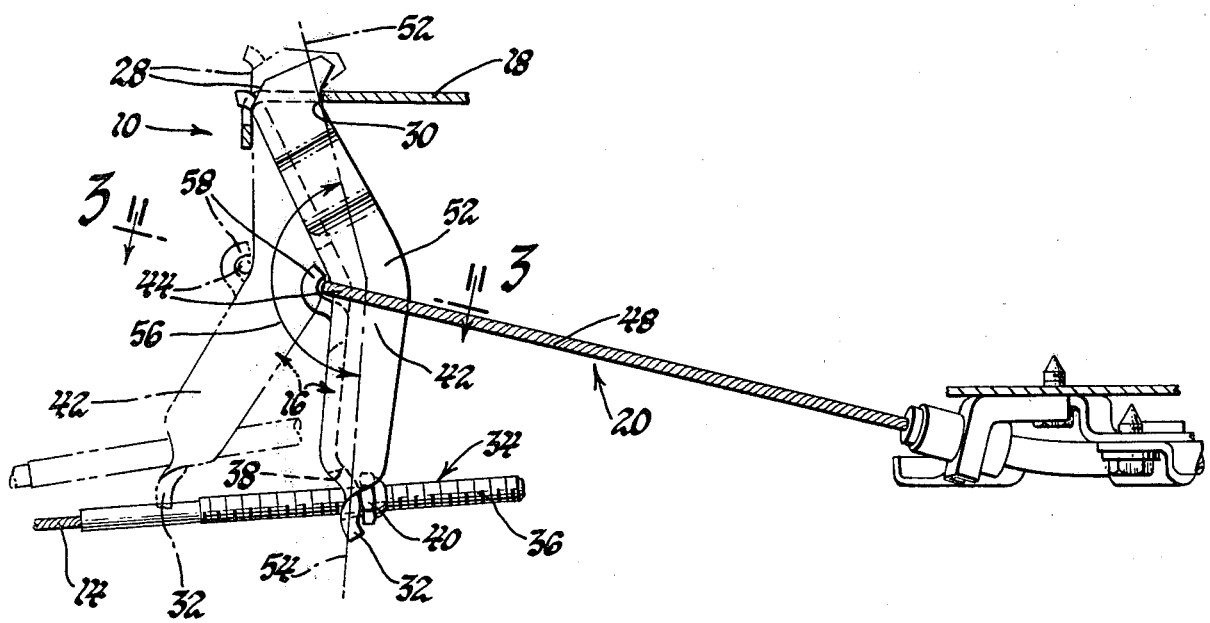
FIG. 2 illustrates the equalizer bar of the mechanism of FIG. 1 in greater detail, showing its connections to other portions of the parking brake actuating mechanism and illustrating it in the brake released position in solid lines and a parking brake applied position in dashed lines.

The vehicle parking brake actuating mechanism 10 illustrated in FIG. 1 includes a parking brake lever 12 arranged to be operated by the vehicle operator. A foot operated lever is illustrated, but other lever arrangements such as a hand operated lever may be used. An apply cable 14 connects lever 12 with the equalizer bar 16, which is pivotally mounted on a fixed vehicle portion 18. A brake actuating cable 20 extends from the equalizer bar 16 to the wheel brakes 22 and 24, which are laterally oppositely disposed on vehicle axle 26. The arrangement is shown with the wheel brakes 22 and 24 being at the rear wheels of the vehicle. However, the invention may be used when the parking brakes are located on the front wheels of the vehicle.

Figure 3:
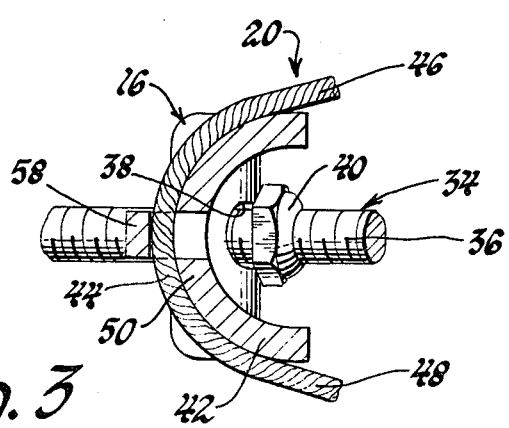
FIG. 3 is a fragmentary cross section view taken in the direction of arrows 3—3 in FIG. 2 and illustrating the retaining means for the brake actuating cable loop.

The equalizer bar 16 has one end 28 pivotally attached at pivot 30 to the fixed vehicle portion 18 for substantially planar pivotal movement about end 28. Equalizer bar 16 has another end 32 provided with an adjustable effective length link 34 attached thereto and secured to the apply cable 14. As is better illustrated in FIG. 3, link 34 includes a threaded member 36 extending through an opening 38 in equalizer bar end 32, and an adjuster lock nut 40 threaded on threaded member 36 on the side of equalizer bar end 32 opposite cable 14. It can be seen that threaded movement of lock nut 40 on member 36 can be accomplished to adjust the effective length of link 34 and therefore of the apply cable 14. This adjustment will adjust the entire brake actuating mechanism leading to the wheel brakes 22 and 24. For example, a shortened effective length of link 34 and cable 14 will tighten the brake actuating cable 20 until the parking brake mechanisms in wheel brakes 22 and 24 are properly adjusted.

The equalizer bar has a center section 42 which receives a loop 44 of brake actuating cable 20 thereabout so that cable segments 46 and 48 of cable 20 respectively extend from the loop 44 to the wheel brakes 22 and 24 and are tensioned and moved when the apply cable 14 is tensioned and moved. The portion 50 of the center section 42 engaging the brake actuating cable loop 44 is angularly displaced toward the wheel brakes 22 and 24 relative to the equalizer bar ends 28 and 32 so that lines 52 and 54 from the bar ends 28 and 32 to the bar center section 42 intersect at the center section 42 at an angle 56 other than 180° in the plane of pivotal movement of the equalizer bar 16. Thus the equalizer bar is somewhat V-shaped.

The equalizer bar center section 42 has suitable means retaining the brake actuating cable loop 44 in position of the center section 42. In the preferred embodiment illustrated, the center section 42 has a tab 58 struck therefrom and bent over the brake actuating cable loop, retaining the cable 20 in position on the cable-engaging center section portion of the equalizer bar 16.

This arrangement eliminates some parts as compared to the equalizer, adjusting and cable connecting mechanism in common use on automotive vehicles at this time. In particular, it eliminates a bolt attached to a center portion of an equalizer bar and a generally semi-circular cable-receiving device mounted on the bolt. It relocates the adjusting mechanism from the bolt and the cable-receiving device so that it is a part of the connection between the brake apply cable and one end of the equalizer bar. By positioning the adjusting mechanism at the opposite end from the pivoting end of the equalizer bar, greater adjusting accuracy may be attained as compared to structure having the adjusting mechanism operatively attached to the center of the equalizer bar. The arrangement also provides easier access to the adjuster nut so that the system is easier to adjust.

The embodiments of the invention in which an exclusive property or privilege is claimed are defined as follows:

1. In a vehicle parking brake actuating mechanism for mechanically actuating a set of laterally oppositely disposed vehicle wheel brakes by a parking brake lever moved by the vehicle operator to apply tension on an apply cable which in turn moves an equalizer bar to equally tension a brake actuating cable having segments leading to each wheel brake of said brake set, the improvement comprising:

said equalizer bar having one end pivotally attached to a fixed vehicle portion for substantially planar pivotal movement about said one end, and having another end provided with an adjustable effective length link attached thereto and secured to the apply cable, said equalizer bar being pivoted about said one end in a brake applying direction when said apply cable is moved by tension force from said parking brake lever, and having a center section receiving a loop of a brake actuating cable thereabout, said brake actuating cable segments extending from said loop to said wheel brakes and being tensioned and moved when said apply cable is tensioned and moved, the portion of said center section engaging said brake actuating cable loop being angularly displaced toward said wheel brakes relative to said equalizer bar ends such that lines from said bar ends to said cable-engaging center portion intersect at said cable-engaging center portion at an angle other than 180° in the plane of pivotal movement of said equalizer bar, and means retaining said brake actuating cable loop in position on said cable-engaging center section portion of said equalizer bar.

2. In a vehicle parking brake actuating mechanism for mechanically actuating a set of laterally oppositely disposed vehicle wheel brakes by a parking brake lever moved by the vehicle operator to apply tension on an apply cable which in turn moves an equalizer bar to equally tension a brake actuating cable segment leading to each wheel brake of said brake set, the improvement comprising:

said equalizer bar having one end pivotally attached to a fixed vehicle portion for substantially planar pivotal movement about said one end, and having another end provided with an adjustable effective length link attached thereto and secured to the apply cable, said equalizer bar being pivoted about said one end in a brake applying direction when said apply cable is moved by tension force from said parking brake lever, and having a center section receiving a loop of a brake actuating cable thereabout, said brake actuating cable segments extending from said loop to said wheel brakes and being tensioned and moved when said apply cable is tensioned and moved, the portion of said center section engaging said brake actuating cable loop being angularly displaced toward said wheel brakes relative to said equalizer bar ends such that lines from said bar ends to said cable-engaging center portion intersect at said cable-engaging center portion at an angle other than 180° in the plane of pivotal movement of said equalizer bar, said equalizer bar center section having a tab struck therefrom and bent over said brake actuating cable loop and retaining said brake actuating cable in position on said cable-engaging center section portion.

* * * * *